US008448566B2

(12) United States Patent
Rezeki

(10) Patent No.: US 8,448,566 B2
(45) Date of Patent: May 28, 2013

(54) HOT BEVERAGE DISPENSER

(76) Inventor: Sadeli Rezeki, Kuala Lumpur (MY)

( * ) Notice: Subject to any disclaimer, the term of this patent is extended or adjusted under 35 U.S.C. 154(b) by 25 days.

(21) Appl. No.: 13/027,781

(22) Filed: Feb. 15, 2011

(65) Prior Publication Data
US 2011/0200719 A1 Aug. 18, 2011

Related U.S. Application Data

(63) Continuation of application No. PCT/MY2008/000085, filed on Aug. 19, 2008.

(51) Int. Cl.
A23F 3/18 (2006.01)

(52) U.S. Cl.
USPC ............... 99/290; 99/295; 99/306; 99/304; 99/315

(58) Field of Classification Search
USPC ............ 426/77, 431, 231; 99/306, 295, 304, 99/315, 290
See application file for complete search history.

(56) References Cited

U.S. PATENT DOCUMENTS

| 2,382,594 | A | * | 8/1945 | Wolcott | 210/238 |
| 3,345,935 | A | * | 10/1967 | Waline | 99/295 |
| 3,634,107 | A | | 1/1972 | Cornelius | |
| 4,138,936 | A | * | 2/1979 | Williams | 99/282 |
| 4,303,525 | A | * | 12/1981 | Stover | 210/455 |
| 4,360,128 | A | | 11/1982 | Neumann | |
| 4,674,400 | A | * | 6/1987 | Rondel et al. | 99/279 |
| 4,757,752 | A | | 7/1988 | Robins et al. | |
| 5,287,797 | A | * | 2/1994 | Grykiewicz et al. | 99/295 |
| 5,775,204 | A | * | 7/1998 | Link et al. | 99/299 |
| 6,250,209 | B1 | * | 6/2001 | Pope | 99/323 |
| 7,021,198 | B1 | * | 4/2006 | Lyall, III | 99/306 |
| 7,182,017 | B1 | | 2/2007 | Knepler et al. | |
| 7,607,386 | B2 | * | 10/2009 | Wise | 99/291 |
| 2003/0126993 | A1 | | 7/2003 | Lassota | |

FOREIGN PATENT DOCUMENTS

GB 2 172 975 10/1986
WO 2008/011042 1/2008

OTHER PUBLICATIONS

International Search Report and the Written Opinion of the International Searching Authority mailed on Aug. 28, 2009 in connection with International Application No. PCT/MY2008/000085.

* cited by examiner

Primary Examiner — Anthony Weier
(74) Attorney, Agent, or Firm — Maschoff Brennan

(57) ABSTRACT

The present invention relates to a beverage dispenser that comprises a hot water tank; a brew basket; a sprayhead for spraying hot water from said water tank to said brew basket in order to brew said brewable substance; a container for storing said freshly brewed liquid concentrate drips from said brew basket; a heat exchanger immersed in hot water inside said water tank for reheating said freshly brewed liquid concentrate when pumped from said container; a source of flavor ingredients preferably packed in disposable bag-in-box; a mixer and whipper for mixing and whipping simultaneously all of the following items: said reheated freshly brewed concentrate discharged from said heat exchanger, said flavor ingredients and hot water from said hot water tank to form a hot freshly brewed beverage mixed with flavored ingredients, filled with air bubbles and with a foamy topping; and a control system for activating said beverage dispenser.

9 Claims, 6 Drawing Sheets

HOT BEVERAGE DISPENSER

CROSS-REFERENCE TO RELATED APPLICATIONS

This application is continuation of International Application Number PCT/MY2008/000085, filed Aug. 19, 2008, which is incorporated herein by reference in its entirety.

FIELD OF INVENTION

The present invention relates to an apparatus and a method for dispensing hot beverages that dispenses hot fresh brewed beverage mixed with flavor ingredients, preferably having air bubbles and with a foamy topping.

BACKGROUND ART

Traditionally, coffee or tea is brewed in a brew basket and drips into a decanter. To keep the beverage warm, the decanter is placed on top of a hot plate. For example, unlike coffee the freshly brewed tea cannot be heated for too long as it gets musty. Therefore, freshly brewed tea dispensers currently available are only used for dispensing iced-tea. Moreover, freshly brewed beverage dispensers currently available only dispense beverages in their original flavor.

Other flavors, such as, sugar or creamer must then be added by the consumers according to their preference.

In addition, conventional brew basket has only one compartment where the brewable substance placed on the filter paper lie flat on the floor wall of the brew container, where the brewed liquid does not flow out easily. It is also inconvenient for user, as the user will need to detach and attach the brew basket in order to replace new coffee or tea brewable substance for every single brewing.

Other types of beverage dispensers which are available in the market dispense hot flavoured coffee or tea by using post-mixed ingredients instead of freshly brewed beverages. Post-mixed ingredients are ingredients that are mixed in form of powder that kept in a container for few servings until it's demanded. The ratio of the constituents for a post-mixed ingredient is pre-determined by the manufacturers of the dispensers.

Thus, there is a need for a dispenser and system that can solve the above mentioned problems in preparing freshly brewed beverages mixed with flavor ingredients with improvements to the beverage brewing dispenser that can efficiently produce hot freshly brewed beverages with maximum extraction by the raw beverage from the brew basket.

The subject matter claimed herein is not limited to embodiments that solve any disadvantages or that operate only in environments such as those described above. Rather, this background is only provided to illustrate one exemplary technology area where some embodiments described herein may be practice.

SUMMARY OF THE INVENTION

The present invention relates to hot beverage dispenser (100) that dispenses hot fresh brewed beverage mixed with flavor ingredients, preferably having air bubbles and with a foamy topping.

One aspect of the invention is to provide hot beverage dispenser (100) comprising of at least one water tank (101) with heating element, at least one sprayhead (112) communicating with the said water tank (101), at least one brew basket (113) with individual compartments to stores a brewable substance, at least one collection container (110) having a pump (138) for transporting brewed liquid concentrate to heat exchanger, at least one heat exchanger (108) in fluid communication with the said water tank (101), at least one source of flavor ingredients (117) having a roller pump with peristaltic mechanism (115), at least one mixer and whipper (116) having fluid communication with said water tank (101), heat exchanger means (108) and source of flavor ingredients (117); and at least one control system using microcontroller for activating the hot beverage dispenser (100), characterized in that the said brew basket (113) with individual compartments has plurality of pre-shaped fins at the base of the said brew basket (113) and further characterized in that the base of the said brew basket (113) slopes towards plurality of discharge holes opening into the said collection chamber.

In this aspect, the individual compartments of the said brew basket (113) having plurality individual openings to receive hot water, plurality of fins on its base to lift bags of brewable substance and at least one opening at the base of each individual compartment for brewed liquid to flow out.

Preferably the pre-shaped fins at the base of the said brew basket (113) longitudinal positioned relative to the walls of the said brew basket (113).

A further object of the invention is that a source of flavour ingredients (117) is fed by a roller pump with peristaltic mechanism (115) for transporting flavour ingredients to said mixer and whipper (116).

The hot beverage dispenser (100) is further characterized in that a mixer and whipper (116) having propelling blade to mix and whip mixture of flavour ingredients (117), fresh brewed liquid concentrate and hot water from the water tank (101) to dispense hot freshly brewed beverage with air bubbles and foamy topping.

Another aspect of the invention is that said water tank (101) having heating element (104) and extension valve (130) to reheat and supply hot water to adjacent hot beverage dispenser. Advantageously, this aspect of the reheat saves the heating energy required.

Another aspect of the invention is that said collection container (110) having dump valve (139) adapted at the bottom of collection container (110) to discard unused brewed liquid concentrate after exceeding predetermined storage time using at least one control system.

Preferably the said collection container (110) will be kept at room temperature or cooled with refrigeration system.

Another aspect of the invention is to provide for a heat exchanger means (108) that is immersed in hot water of said water tank (101) and is used to reheat brewed liquid concentrate by flowing inside heat exchanger means (108) when in operation.

It is also provided that in the present invention a method for dispensing hot fresh brewed beverage from hot beverage dispenser (100) further characterized in that said collection container (110) discard unused brewed liquid concentrate after exceeding predetermined storage time using dump valve (139) adapted at the bottom of collection container (110) and controlled by control system.

The present invention also relates to a method for dispensing hot fresh brewed beverage from hot beverage dispenser (100) further characterized in that said collection container (110) discard unused brewed liquid concentrate after exceeding predetermined storage time using dump valve (139) adapted at the bottom of collection container (110) and controlled by control system.

The present invention consists of several novel features and a combination of parts hereinafter fully described and illustrated in the accompanying drawings, it being understood that various changes in the details may be made without departing from the scope of the invention or sacrificing any of the advantages of the present invention.

BRIEF DESCRIPTION OF ACCOMPANYING DRAWINGS

To further clarify the embodiments of the present invention, a more particular description of the invention will be rendered by references to specific embodiments thereof, which are illustrated in the appended drawings. It is appreciated that these drawings depict only typical embodiments of the invention and are therefore not to be considered limiting of its scope. The invention will be described and explained with additional specificity and detail through the accompanying drawings in which.

DETAILED DESCRIPTION OF THE PREFERRED EMBODIMENTS

Embodiments of the invention relate to an apparatus and a method for dispensing hot beverages that dispenses hot fresh brewed beverage mixed with flavor ingredients, preferably having air bubbles and with a foamy topping. Hereinafter, this specification will describe the present invention according to the preferred embodiments of the present invention. However, it is to be understood that limiting the description to the preferred embodiments of the invention is merely facilitating discussion of the present invention and it is envisioned without departing from the scope of the appended claims.

Figure 1:
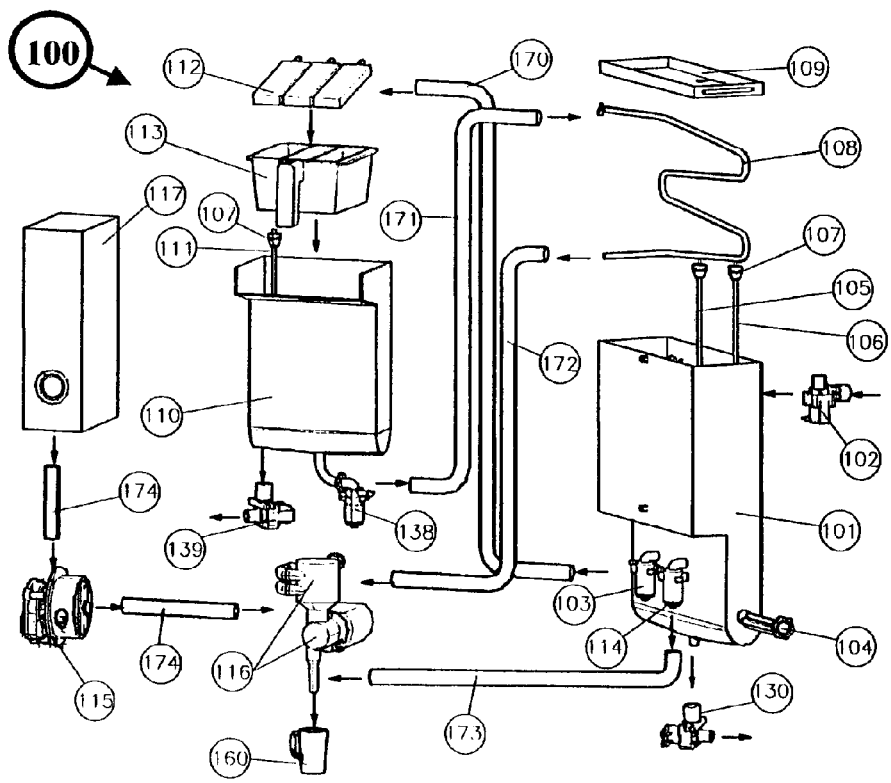
FIG. 1 illustrates exploded view on hot beverage dispenser of the present invention.

Reference is now being made to FIG. 1, where it illustrates exploded view on hot beverage dispenser of the present invention. The arrows denote the flow of water from source, hot water from the water tank, the freshly brewed liquid concentrate, and the flavor ingredients within the beverage dispenser.

A water tank 101, is used to store and heat water. A heating element 104 is positioned at the bottom within the water tank 101. The source of water may be from filtered tap water or any tasteless potable water. The water supply from the source to the water tank 101 is controlled by a solenoid inlet-valve 102. The heating element 104 heats water in the water tank 101 to a temperature between about 85 degrees Celsius and about 100 degrees Celsius. A water pump 103 transports the hot water from the water tank 101 to a sprayhead 112 through a silicon tubing means 170. The sprayhead 112 sprays the hot water onto the brewable substance placed inside an individual compartment of a multi-compartment brew basket 113. The brewable substance can be, but is not limited to, coffee or tea. The hot water, passing through the brew basket 113 of the brewable substance, brews the brewable substance to produce a freshly brewed liquid concentrate.

The brewable substance is preferably packed inside a disposable water-resistant filter paper so that it can be replaced and discarded conveniently.

During brewing, drips of the freshly brewed liquid concentrate from the multi-compartment brew basket 113 are collected and stored in a container 110. In order to preserve the flavor of the freshly brewed liquid concentrate, the freshly brewed liquid concentrate is stored at room temperature or cooled with a refrigeration system. However when a beverage is desired, the cool freshly brewed liquid concentrate has to be reheated so that the beverage is hot enough when dispensed in a high-speed manner. A pump 138 transports the cool freshly brewed liquid concentrate from the container 110 to flow through a heat exchanger 108 via a silicon tubing means 171. The heat exchanger 108 is immersed in the hot water in the water tank 101 to quickly transfer heat from the hot water in the water tank 101 to the cool freshly brewed liquid concentrate so that the beverage has a temperature of more than about 60 degrees Celsius when dispensed.

After passing through the heat exchanger 108 immersed in the hot water in water tank 101, the reheated freshly brewed liquid concentrate is collected in a mixer and whipper 116 through a silicon tubing means 172. A source of liquid flavor ingredients 117 is also transported to the mixer and whipper 116 by a roller pump 115. The roller pump 115 is used to transport the high viscosity liquid of flavor ingredients 117. The liquid flavor ingredients 117 can include one of the following items, but are not limited to, Condensed Sweetened Milk, Condensed Sweetened Creamer, Condensed Filled Milk, Condensed Filled Creamer or sugar syrup. Simultaneously, a pump 114 transports the hot water from the water tank 101 through a silicon tubing means 173 into the mixer and whipper 116 to form a mixture consisting of the reheated freshly brewed liquid concentrate from the heat exchanger 108, the flavor ingredients 117 and the hot water from the water tank 101. The mixture is then whipped by a propelling blade adapted inside the mixer and whipper 116 to produce an evenly mixed hot beverage filled with air bubbles and with a foamy topping.

In another preferred embodiment, the operations of the dispenser are controlled by a control system comprising a printed circuit board, electronic components, electrical components and a microcontroller. In order for the beverage dispenser to perform properly, the heater element 104, the water inlet-valve 102, the water pump 103, the water pump 114, the liquid concentrate pump 138, the roller pump 115 and a propelling blade adapted within the mixer and whipper 116 are all actuated by the control system. The amount of the hot water, the reheated freshly brewed liquid concentrate and the flavor ingredients for producing a beverage are also controlled by the programs embedded in the control system.

Figure 2:
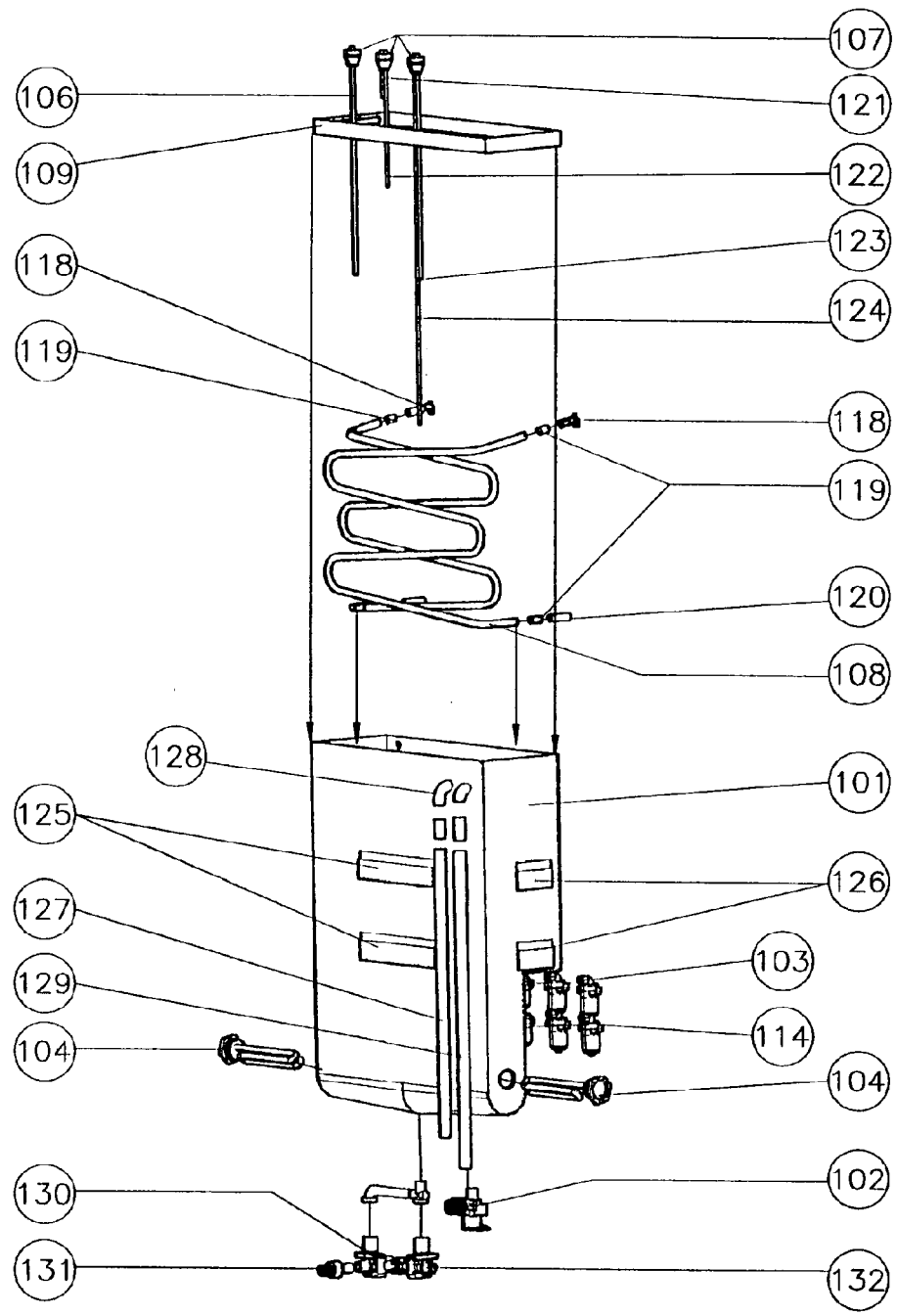
FIG. 2 illustrates cross-sectional rear view hot beverage dispenser's water tank of the present invention.

Reference is now being made to FIG. 2 and FIG. 1 collectively. FIG. 2 illustrates cross-sectional rear view hot beverage dispenser's water tank of the present invention. Water from the water source enters the water tank 101 through the water inlet-valve 102 connected to the water tank 101 via a tubing means 129. The water inlet-valve 102 is actuated by the control system. A heat exchanger 108 for reheating the freshly brewed liquid concentrate and a heater element 104 to heat the water are also installed inside the water tank.

A lid 109 covers the water tank 101 in order to prevent heat from the hot water inside the water tank 101 from dissipating into the atmosphere and to prevent the hot water from spilling. The water tank 101 has a dump-hole 128 to release excess water and the vapor from the hot water. Rear-hooks 125 and side-hooks 126 are mounted on the walls of the water tank 101 to secure the water tank 101 to a mainframe 140 of FIG. 6.

The heat exchanger 108 will hereinafter be described in further detail. The upper end of the heat exchanger 108 is connected to a heat exchanger inlet-socket 118, which is already built-in the wall of the water tank 101, with a detachable silicon tubing connector 119 for easy installation and maintenance. The bottom end of the heat exchanger 108 is connected to a heat exchanger outlet-socket 120, which is already built-in the wall of the water tank 101, with a detachable silicon tubing connector 119. The heat exchanger inlet-socket 118 is connected to the liquid concentrate pump 138 of FIG. 1 with the silicon tubing means 171 of FIG. 1, while the heat exchanger outlet-socket 120 is connected to the mixer and whipper 116 of FIG. 1 or FIG. 5 with the silicon tubing means 172 of FIG. 1. When a beverage is desired, the liquid concentrate pump 138 of FIG. 1 or FIG. 3 transports the cool freshly brewed liquid concentrate from the container 110 to flow through the heat exchanger 108, which is immersed in the hot water inside the water tank 101, in order to quickly transfer heat from the hot water inside the water tank 101 to the cool freshly brewed liquid concentrate. The heat exchanger 108 is preferably made of a non-corrosive and high heat induction material such as, but not limited to copper tubing.

A plurality of sensors is installed in the water tank 101, such as a temperature sensor 106 and a plurality of water sensors 121, 122, 123, 124. All the sensors are in communication with the control system. If the temperature sensor 106 indicates the temperature of the water inside the water tank 101 falls below about 85 degrees Celsius, then the control system will activate the heater elements 104 to heat the water inside the water tank 101. On the other hand, if the temperature sensor 106 indicates that the temperature of the water inside the water tank 101 has reached about 100 degrees Celsius, then the control system will deactivate the heater element 104.

The different levels of water sensors 121, 122, 123, 124 installed in the water tank 101 are used to detect the different levels of hot water inside the water tank 101. If the low water level sensor 123 indicates that the level of hot water inside the water tank 101 has fallen below the heater element 104, then the control system will not activate the heater element 104 regardless of the temperature of the water inside the water tank 101 to prevent the heater element 104 from overheating. If the high water level sensor 121 indicates that the level of hot water inside the water tank 101 has reached the highest limit of the water tank 101, then the control system will actuate the water inlet-valve 102 to close for preventing the water tank 101 from overfilling. Another water level sensor 122 indicates that the level of hot water inside the water tank 101 is sufficient for brewing. If the hot water level inside the water tank 101 falls below the water level sensor 122, then the control system will stop transporting the hot water to the sprayhead 112 of FIG. 1 or FIG. 5 for brewing although the container 110 of FIG. 1 or FIG. 3 has run out of the freshly brewed liquid concentrate. Simultaneously, the control system actuates the water inlet-valve 102 to open to allow water from the source to flow into the water tank 101. The empty tank sensor 124 indicates the water tank 101 is dry and ready for maintenance.

A plurality of silicon grommets 107 is used for securing the temperature sensor 106 and the plurality of water sensors 121, 122, 123, 124 to the lid 109 of the water tank 101. At least two water pumps 103 and 114 are attached to the water tank 101. The water pump 103 transports the hot water from the water tank 101 to the sprayhead 112 of FIG. 1 or FIG. 5 through the silicon tubing means 170 of FIG. 1, while the water pump 114 transports the hot water from the water tank 101 to the mixer and whipper 116 of FIG. 1 or FIG. 5 through the silicon tubing means 173 of FIG. 1.

During maintenance, a dump-valve 132 attached at the bottom of the water tank 101 discards the water inside the water tank 101.

Insulated material wraps around the water tank 101 to prevent heat dissipation from the hot water inside the water tank 101 to the beverage dispenser or the atmosphere.

In another preferred embodiment, the water tank 101 also comprises an extension valve 130 to allow the hot water from the water tank 101 to flow to other adjacent dispensers so that the adjacent dispensers do not need to have their own water tank to save cost of fabrication and electricity.

Figure 3:
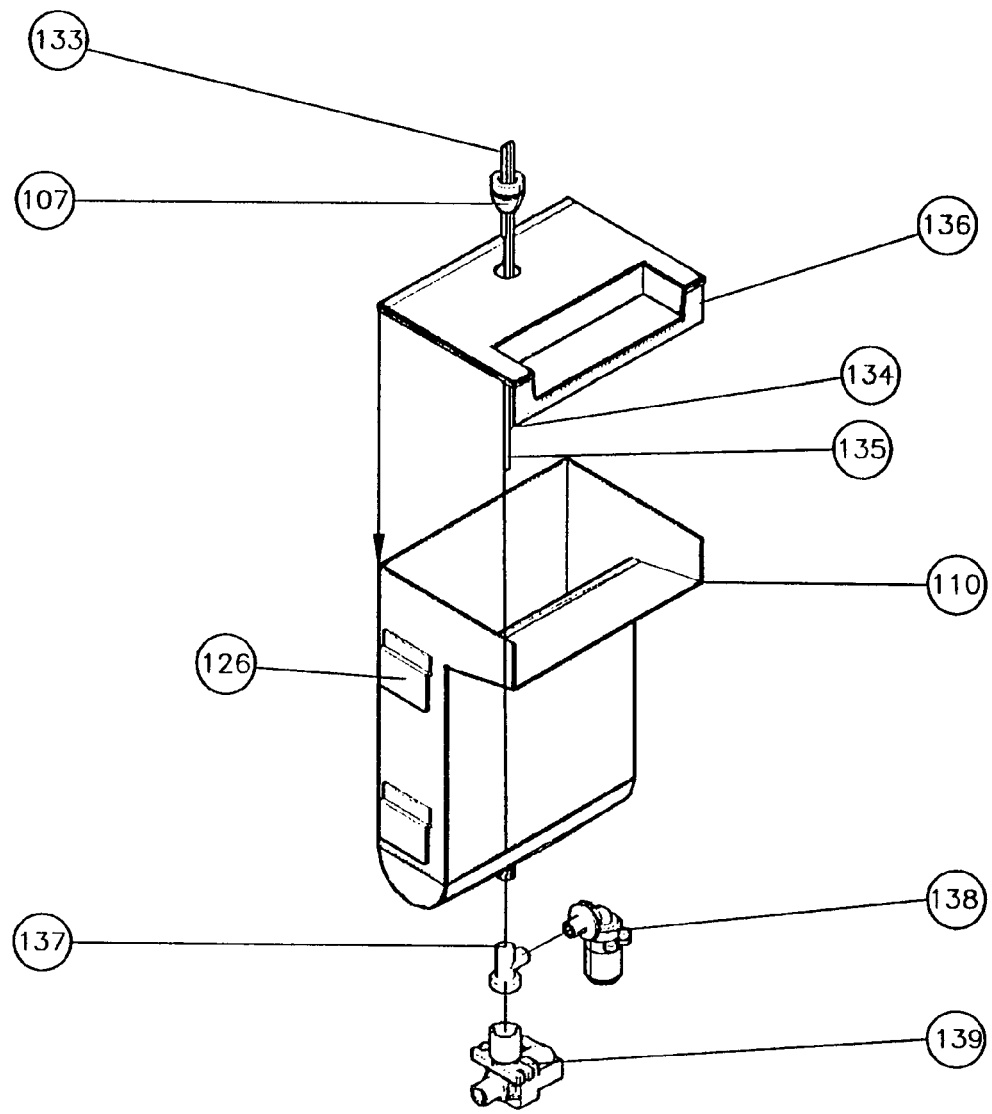
FIG. 3 illustrates cross-sectional front view on hot beverage dispenser's collection container of the present invention.

Reference is now being made to FIG. 3, FIG. 2 and FIG. 1 collectively. FIG. 3 illustrates cross-sectional front view on hot beverage dispenser's collection container of the present invention. The container 110 is used to store the freshly brewed liquid concentrate. At the top of the container 110 is a lid 136 with an opening to receive drips of the freshly brewed liquid concentrate from the multicompartment brew basket 113 of FIG. 1 or FIG. 4 or FIG. 5. At each side of an outlet-socket 137, which is attached at the bottom of the container 110, is a concentrate pump 138 and a concentrate dump-valve 139.

When a beverage is required, the concentrate pump 138 transports the cool freshly brewed liquid concentrate from the container 110 to the heat exchanger inlet-socket 118 of FIG. 2 through the silicon tubing means 171 of FIG. 1 so that the cool freshly brewed liquid concentrate can flow through the heat exchanger 108 of FIG. 1 or FIG. 2, which is immersed in the hot water inside the water tank 101, to be reheated.

The liquid concentrate dump-valve 139 is used to discard the freshly brewed liquid concentrate from the container 110 when the freshly brewed liquid concentrate exceeds storage time or at the end of the day or during maintenance. Both the liquid concentrate pump 138 and the liquid concentrate dump-valve 139 are activated by the control system of the dispenser. Side-hooks 126 are mounted on the walls of the container 110 to secure container 110 to a mainframe 140 of FIG. 6.

A plurality of liquid level sensors 133, 134, 135 is installed in the container 110 to detect levels of the freshly brewed liquid concentrate inside the container 110 and to determine when the brewing process should take place. If the freshly brewed liquid concentrate in the container 110 falls below the low level sensor 134, then the control system will execute the brewing process. On the other hand, if the liquid concentrate in the container 110 reaches the highest level sensor 133, then the control system will stop the brewing process. The lowest level sensor 135 indicates that the expired freshly brewed liquid concentrate is well discarded from the container 110.

A plurality of silicon grommets 107 is used to secure the plurality of liquid level sensors 133, 134, 135 to the lid 136, which is tightened at the top of the container 110.

Figure 4:
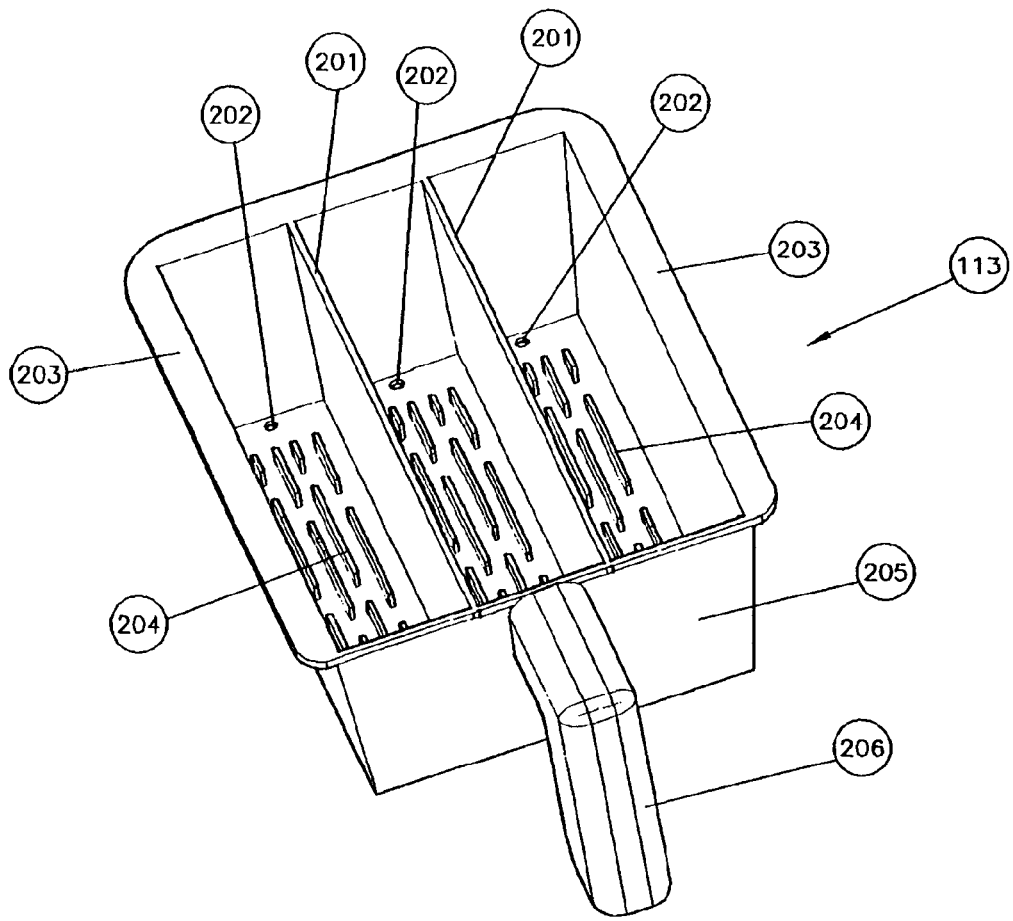
FIG. 4 illustrates perspective view of the multi-compartment brew basket of the present invention.

Reference is now being made to FIG. 4, FIG. 3, FIG. 1 and FIG. 5 collectively. FIG. 4 illustrates perspective view of the multi-compartment brew basket of the present invention. A plurality of partitions 201 is located within the brew basket 113 to make up a plurality of compartments for the brew basket 113. Each compartment of the brew basket 113 stores a beverage bag of brewable substance which can be, but is not limited to, coffee or tea. As each brewing process needs a new beverage bag of brewable substance, the brew basket 113 comprising a plurality of compartments storing a plurality of the beverage bags makes the dispenser more convenient to use by eliminating the need to replace a new beverage bag for every single brewing.

Above each compartment of the brew basket 113 is an opening to receive hot water from the sprayhead 112 of FIG.

Figure 5:
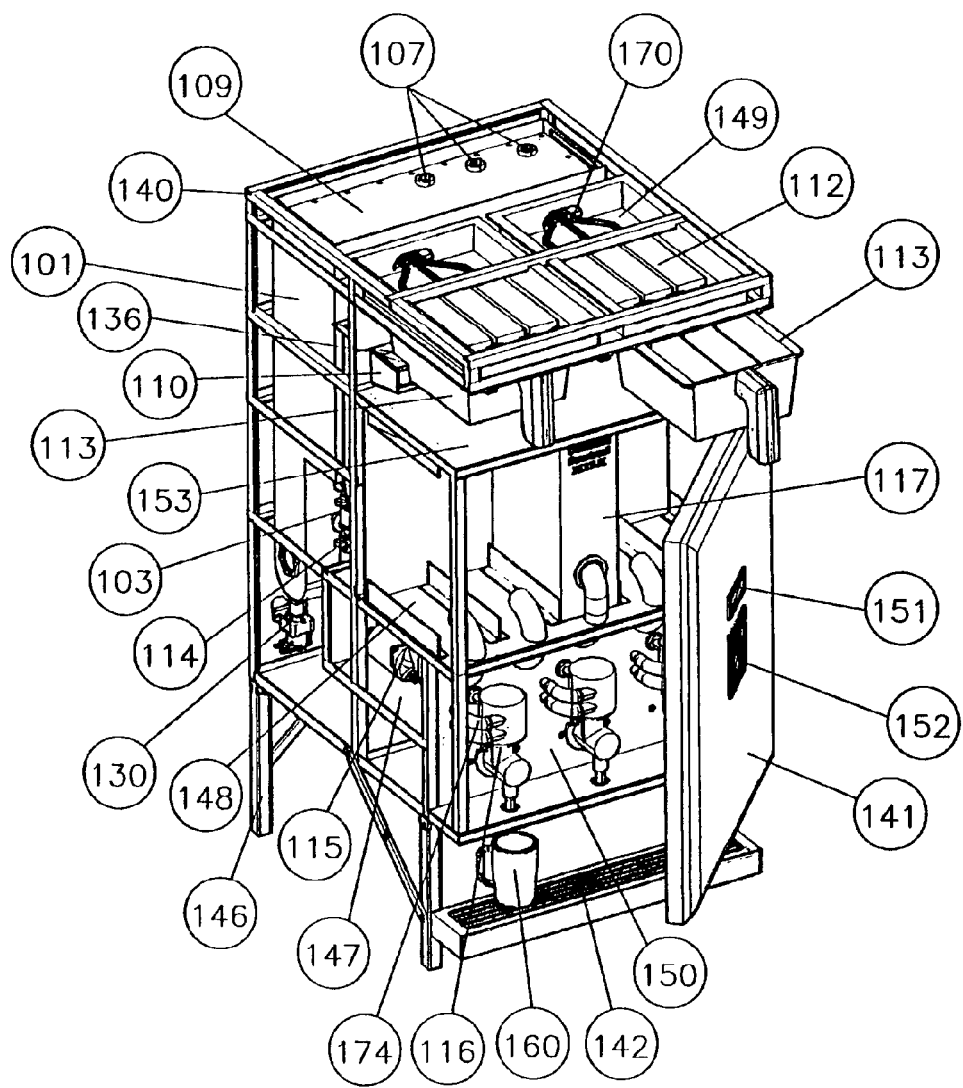
FIG. 5 illustrates perspective view of the hot beverage dispenser of the present invention.

1 or FIG. 5. The hot water flows through the compartment of the brew basket 113, which stores a beverage bag, to brew the brewable substance and hence produce a freshly brewed liquid concentrate. The freshly brewed liquid concentrate, which drips through at least one hole 202 at the base of the brew basket 113, is collected and stored in the container 110 of FIG. 1 or FIG. 3. A plurality of sprayheads 112 of FIG. 1 or FIG. 5 is positioned above the plurality of compartments of the brew basket 113 in corresponding with each other. Therefore, the number of compartments of the brew basket 113 corresponds to the number of the sprayheads 112 of FIG. 1 or FIG. 5.

A plurality of fins 204 at the base of the brew basket 113 is used to lift the beverage bag so that the hot water from sprayhead 112 of FIG. 1 or FIG. 5 can flow through the beverage bag thoroughly. The base of the brew basket 113 slopes down toward the hole 202 so that the freshly brewed liquid concentrate flows and accumulates at the opening of hole 202.

At the wall 205 of the brew basket 113 is a flange 203 for attaching the brew basket 113 to the beverage dispenser and a handle 206 so that the user can hold the brew basket with ease.

The multi-compartment brew basket 113 is preferably made of, but is not limited to food grade plastic or stainless steel. If the multi-compartment brew basket 113 is made of stainless steel, then the handle 206 is preferably made of non heat conductor material such as, but not limited to plastic or wood.

Reference is now being made to FIG. 5. FIG. 5 illustrates perspective view of the hot beverage dispenser of the present invention. All the components that perform various tasks mentioned above are housed inside a mainframe 140. At the front of the dispenser, a door 141 is hinged to the mainframe 140 at one side. The door 141 comprises a selection panel with multiple buttons 152 to provide various options for the operator; and a display panel 151 to show the status of the dispenser.

Inside the mainframe 140, a plurality of sprayheads 112 is secured at a sprayhead holder 149, which is positioned above a plurality of detachable multi-compartment brew baskets 113. A plurality of hot beverage dispenser's collection containers 110 are hooked and secured to the mainframe 140 by a plurality of side-hooks 126 of FIG. 3. The plurality of hot beverage dispenser's collection containers 110 are positioned underneath the plurality of the multi-compartment brew basket 113 to receive and store the freshly brewed liquid concentrate drips from the plurality of multi-compartment brew baskets 113. Inside the mainframe 140, a plurality of roller pumps 115 is secured to a roller pump holder 147 which is positioned near a plurality of the flavor ingredients 117. When a beverage is required, the roller pump 115 transports the high viscosity liquid flavor ingredients 117 to the mixer and whipper 116 through a silicon tubing means 174 of FIG. 1. The mixer and whipper 116 have a plurality of inlets, so that when a beverage is required, the reheated freshly brewed liquid concentrate, the liquid flavor ingredients 117, and the hot water can be transported to the mixer and whipper 116 simultaneously to form a mixture. Inside the mixer and whipper 116 is a propelling blade to mix and whip the mixture in order to create air bubbles inside the mixture.

The flavor ingredients 117 are preferably packed in a disposable bag-in-box package comprising a plastic bag or a plastic bag with aluminium lining inside a corrugated box. The bag has a fitting to which a tube can be attached. The tube is connected to the roller pump 115, so that the flavor ingredients 117 can be transported to the mixer and whipper 116 upon demand. A plurality of mixers and whippers 116 is mounted at the internal front-wall 150 of the dispenser. A cup 160 is placed right underneath the mixer and whipper 116 to receive a ready-to-drink hot freshly brewed beverage dispensed from the mixer and whipper 116. The dispensed beverage is a hot freshly brewed beverage mixed with flavor ingredients, filled with air bubbles and with a foamy topping. A drip-tray 142 is placed underneath the dispenser to collect the remaining drips or the overflow of the beverage after dispensing.

Figure 6:
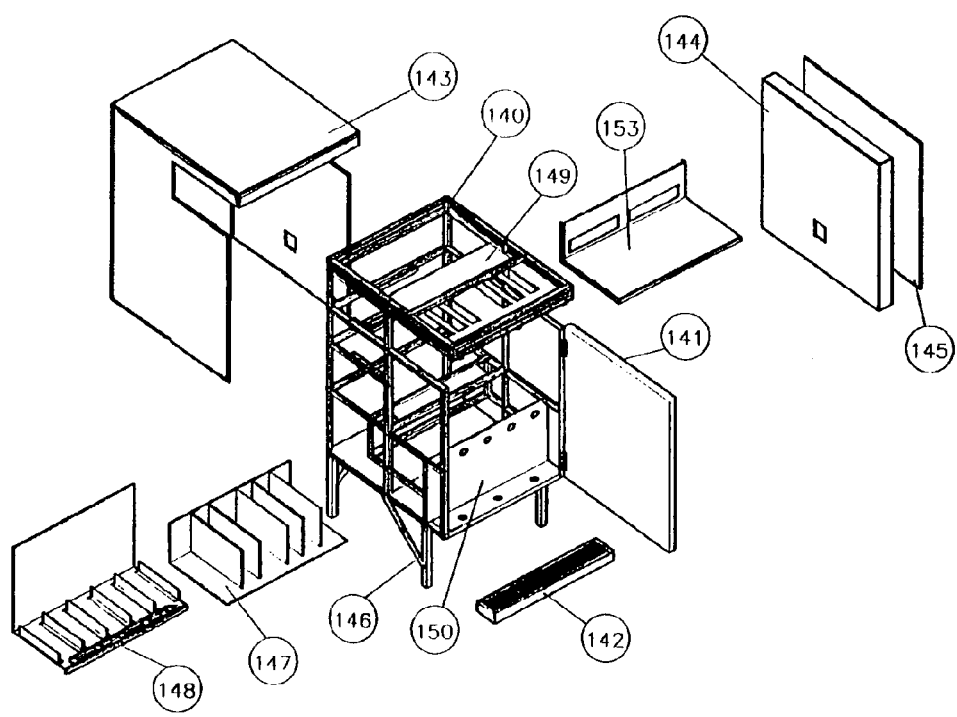
FIG. 6 illustrates cross-sectional view of the hot beverage dispenser of the present invention.

Reference is now being made to FIG. 6 and FIG. 5 collectively. FIG. 6 illustrates cross-sectional view of the hot beverage dispenser of the present invention. The mainframe 140 is the main part whereby all the mechanisms of the dispenser are built upon. The door 141 is hinged at one side of the mainframe 140 and can be opened for refilling the bag-in-box flavor ingredients 117 of FIG. 1 or FIG. 5 or for maintenance. An ingredient-shelf 148 having multiple dividers is used for storing a plurality of bag-in-box of the liquid flavor ingredients 117 of FIG. 1 or FIG. 5. A roller-pump-holder 147 is used to hold a plurality of roller pumps 115 of FIG. 1 or FIG. 5 in place and is positioned near the plurality of bag-in-box of the flavor ingredients 117 of FIG. 1 or FIG. 5.

An internal front-wall 150 is used to hold a plurality of mixers and whippers 116 of FIG. 1 or FIG. 5.

A sprayhead holder 149 is used to secure a plurality of sprayheads 112 of FIG. 1 or FIG. 5 at a position above a plurality of multi-compartment brew baskets 113 of FIG. 1 or FIG. 4 or FIG. 5.

The control system, consisting of multiple electronic components, multiple electrical components and a microcontroller, controls all of the above-mentioned operations of the beverage dispenser. The control system is adapted inside a waterproof controller-housing 144 and is covered with a controller-housing-cover 145. Sequences for the dispenser to operate are preprogrammed and are embedded within the microcontroller in the control system. The controller-housing 144, covered with the controller-housing-cover 145, is mounted on one side of the mainframe 140. Multiple electrical wirings are used by the control system to actuate all the motors embedded with the water pump 103 of FIG. 1 or FIG. 2, the water pump 114 of FIG. 1 or FIG. 2, the roller pump 115 of FIG. 1 or FIG. 5, the concentrate pump 138 of FIG. 1 or FIG. 3 and the motor for mixer and whipper 116 of FIG. 1 or FIG. 5. Multiple electrical wirings are used by the control system to actuate solenoids embedded with the water inlet valve 102 of FIG. 1 or FIG. 2, the dump valve 132 of FIG. 2, the extension valve 130 of FIG. 2 and the concentrate dump valve 139 of FIG. 3. The control system is preprogrammed so that the dispenser can perform in a proper manner according to the information gathered from all the sensors 106, 121, 122, 123, 124, 133, 134, 135 of FIG. 2 or FIG. 3.

A plurality of foldable-legs 146 is attached at the bottom of the mainframe 140 to save space during transportation. A casing 143 is used to cover the overall mechanism and interior parts of the dispenser built upon the mainframe 140.

In another preferred embodiment, the control system of the dispenser is further equipped with a wireless modem for wireless communication between the dispenser and its service centre for timely material supply or maintenance. Various control operations of the dispenser can also be reprogrammed wirelessly via the wireless modem.

The present invention may be embodied in other specific forms without departing from its essential characteristics. The described embodiments are to be considered in all respects only as illustrative and not restrictive. The scope of the invention is, therefore indicated by the appended claims rather than by the foregoing description. All changes, which come within the meaning and range of equivalency of the claims, are to be embraced within their scope.

The invention claimed is:

1. A hot beverage dispenser comprising:
   at least one water tank;
   at least one heating element in fluid communication with said water tank;
   at least one heat exchanger immersed in said water tank;
   at least one sprayhead communicating with said water tank;
   at least one brew basket with individual compartments to store a brewable substance and having individual openings to receive fluid from said sprayhead;
   at least one collection container for receiving brewed liquid concentrate from said brew basket and having a pump for transporting said brewed liquid concentrate to said heat exchanger;
   at least one source of flavor ingredients;
   at least one whipper having communication with said water tank, said heat exchanger means and said source of flavor ingredients;
   at least one pump for moving said flavor ingredients to said whipper;
   at least one pump or valve attached at said water tank for moving water from said water tank to said whipper;
   at least one control system for activating said hot beverage dispenser,
   characterized in that said heat exchanger reheat said brewed liquid concentrate by flowing said brewed liquid concentrate through the inside said heat exchanger when operating so that the heat from the hot water inside said water tank is transferred to said brewed liquid concentrate, wherein the inlet of said heat exchanger is connected to said brewed liquid concentrate pump attached at said collection container and outlet of said heat exchanger is connected to the whipper to create an evenly mixed hot beverage filled with a foamy topping.

2. A hot beverage dispenser as claimed in claim 1, further characterized in that said source of flavor ingredients having a pump for said transporting flavor ingredients to said whipper.

3. A hot beverage dispenser as claimed in claim 1, wherein said whipper having propelling blade to whip mixture of said flavor ingredients, hot water from said water tank and said reheated brewed liquid concentrate from said heat exchanger to dispense hot brewed beverage with air bubbles and foamy topping.

4. A hot beverage dispenser as claimed in claim 1, wherein at least one control system having wireless communication means for communication to a service center for servicing and maintaining.

5. A hot beverage dispenser as claimed in claim 1, wherein said hot beverage dispenser having extension valve to supply hot water to second hot beverage dispenser.

6. A hot beverage dispenser as claimed in claim 1, wherein said collection container having dump valve adapted at the bottom of said collection container to discard unused said brewed liquid concentrate after exceeding predetermined storage time using at least one control system.

7. A hot beverage dispenser as claimed in claim 1, wherein said brewed liquid concentrate is stored inside said collection container at room temperature or cooled with refrigeration system.

8. A hot beverage dispenser as claimed in claim 1, wherein said heat exchanger means is immersed in hot water of said water tank to reheat said brewed liquid concentrate by flowing said brewed liquid concentrate through the inside said heat exchanger means when operating so that the heat from said hot water inside said water tank is transferred to said brewed liquid concentrate.

9. A hot beverage dispenser as claimed in claim 1, wherein said brew basket with individual compartments having plurality of individual openings to receive hot water from said sprayhead and pre-shaped fins at the base to lift bags of said brewable substance which are longitudinal positioned relative to the walls with at least one opening at the base of each individual compartment for said brewed liquid concentrate to flow out.

* * * * *